United States Patent [19]

Knetzer

[11] Patent Number: 4,945,799
[45] Date of Patent: Aug. 7, 1990

[54] TOOL GUIDE

[76] Inventor: Marvin D. Knetzer, 1232 Baker, Wichita, Kans. 67212

[21] Appl. No.: 328,478

[22] Filed: Mar. 24, 1989

[51] Int. Cl.⁵ ............................................... B27B 5/20
[52] U.S. Cl. ..................... 83/745; 83/486.1; 83/471.3; 83/522.28; 83/574
[58] Field of Search ............... 83/745, 574, 522, 581, 83/471.3, 486.1, 522.28

[56] References Cited

U.S. PATENT DOCUMENTS

| | | | |
|---|---|---|---|
| 3,045,724 | 7/1962 | Mitchell | 83/574 |
| 3,304,967 | 2/1967 | Kujan | 83/574 X |
| 4,489,634 | 12/1984 | Volk | 83/522.28 |
| 4,587,875 | 5/1986 | Deley | 83/574 X |

Primary Examiner—Frank T. Yost
Assistant Examiner—Scott A. Smith
Attorney, Agent, or Firm—Litman, McMahon & Brown

[57] ABSTRACT

A guide for guiding a tool on a workpiece including a surface and an edge includes a guide rod with front and back ends. An angle section is provided for engaging the workpiece surface and edge, and is pivotally connected to the guide rod back end by a connector assembly including a pivot pin which pivotally connects an upper plate attached to the guide rod to a lower plate attached to the angle section. A clamp bolt is provided for releaseably securing the plates together in various angular, rotational orientations with respect to each other. A guide tube is provided for releaseable attachment to the tool and telescopically and slidably receives the guide rod.

9 Claims, 2 Drawing Sheets

TOOL GUIDE

BACKGROUND OF THE INVENTION

1. Field of the Invention.

The present invention relates generally to tools, and in particular to a guide for guiding various power tools on workpieces.

2. Description of the Prior Art.

A variety of power tools have heretofore been devised for performing various operations on workpieces. For some types of operations, the tool can be guided on the workpiece in a "freehand" manner by the operator. However, other tasks yield better results if the tool is guided on the workpiece or the workpiece is guided on the tool. For example, radial arm saws are generally operated by retaining the workpiece and guiding a moving saw blade thereacross. Table saws, on the other hand, generally have stationary saw blades through which workpieces are guided. With both types of saws, relatively straight cuts can be achieved. However, such tools tend to be relatively expensive. They also suffer from the disadvantage of not being easily transportable by one worker from one location to another on a jobsite.

Other types of power tools may be less expensive and more portable, but those that are guided in a freehand manner typically do not provide the precision and accuracy of the larger, more costly, less portable equipment described previously. Included in this second category of power tools are circular saws, reciprocating saws, routers and the like.

Circular saws are commonly used in various types of construction and are capable of performing many of the same tasks as radial arm saws and table saws. However, the accuracy and precision of their cuts is somewhat dependent upon the skill of the operator. Furthermore, since circular saws lack the built-in guide features of radial arm saws, table saws and the like, cross-cutting a board at a close approximation of a ninety degree cut can involve several steps, such as measuring the board with a measuring device, marking a straight line at ninety degrees to its edges with a square or the like and, finally, guiding the saw freehand across the board. The common necessity of such steps is a disadvantage of circular saws and similar tools.

Although various devices have heretofore been devised for guiding power tools on workpieces, none has been devised with the advantages and the features of the present invention.

SUMMARY OF THE INVENTION

In the practice of the present invention, a guide is provided for guiding a tool on a workpiece including a surface and a back edge. The guide includes a guide rod with front and back ends and an angle section for engaging a workpiece surface and back edge. A connector assembly includes an upper plate connected to the guide rod back end and a lower plate connected to the angle section. A pivot pin pivotally interconnects the upper and lower plates and a clamp bolt is provided for clamping them together with the guide rod and angle section in predetermined, rotational, angular orientations with respect to each other. A guide tube assembly includes juxtaposed guide tubes, each of which is adapted for slidably receiving a guide rod for performing certain types of cuts. The guide tube assembly also includes a connecting bar extending laterally from one of the guide tubes and adapted for releaseable connection to the tool.

OBJECTS OF THE INVENTION

The principal objects of the present invention are: to provide a guide for tools; to provide such a guide which is particularly adapted for hand-held power tools; to provide such a guide which is especially adapted for circular saws; to provide such a guide which is adapted for guiding tools through cuts having various angular orientations; to provide such a guide which can eliminate the necessity of marking a board to be cut with a square or similar type of device; to provide such a guide which is adaptable for most circular saws; to provide such a guide which is adaptable for many types of cutting jobs; and to provide such a guide which is economical to manufacture, efficient in operation, capable of a long operating life and particularly well adapted for the proposed use thereof.

A further object of this invention is to provide a guide system with a retainer for retaining a saw blade guard in a retracted position and automatically releasing same.

Yet another object of this invention is to provide a guide with a leveling device for making cuts which are either vertical or horizontal.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
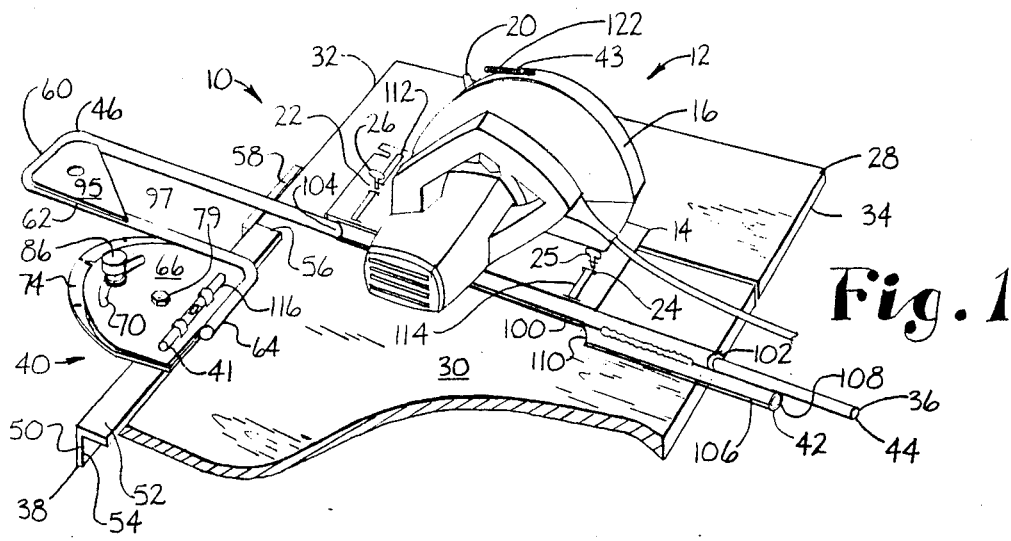
FIG. 1 is a perspective view of a guide embodying the present invention, shown mounted on a circular saw for guiding same across a workpiece.
Figure 2:
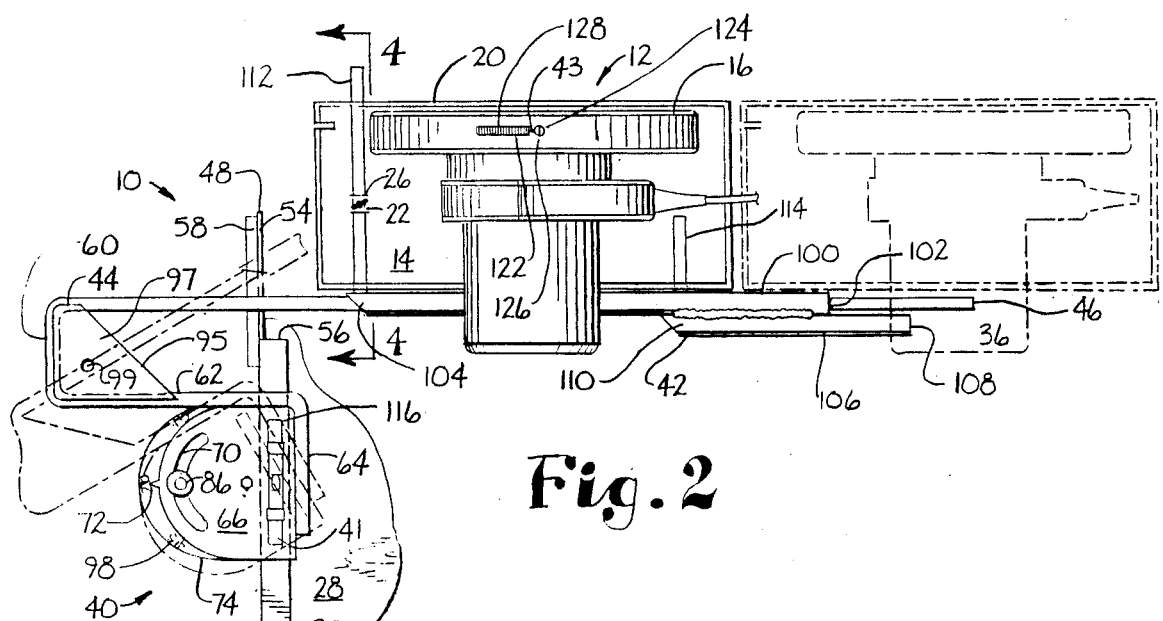
FIG. 2 is a top plan view of the guide, circular saw and workpiece.
Figure 3:
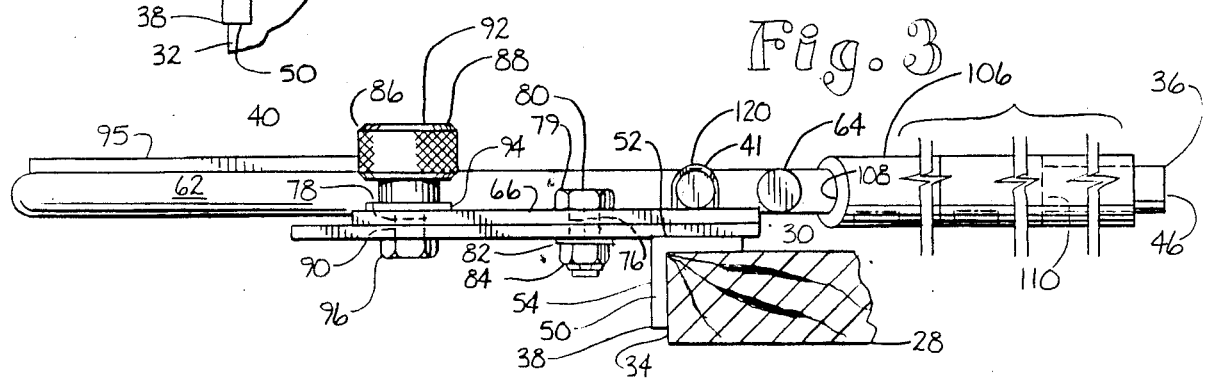
FIG. 3 is an enlarged, fragmentary, left side elevational view of the guide.

I. Introduction and Environment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally designates a guide embodying the present invention. Without limitation on the generality of useful applications of the guide 10, it is shown mounted on a circular saw 12 with a shoe 14; an upper, fixed blade guard 16; and a lower, retractable blade guard 18 with a retracting lever 20. Front and back rip guide mounting brackets 22, 24 are provided on the front and back of the shoe 14 and include thumb screws 26.

Without limitation of the generality of the useful applications of the guide 10, it is shown and described guiding the circular saw 12 on a workpiece 28, e.g. a board, with a surface 30, a front edge 32 and a back edge 34. Without limitation, the invention is described herein as it is oriented in FIG. 1 with the circular saw 12 being referred to as traveling from front-to-back on top of the workpiece 28.

The guide 10 generally comprises a guide rod 36, an angle section 38, a connector assembly 40, a leveling assembly 41, a guide tube assembly 42 and a blade guard retainer 43.

II. Guide Rod 36.

Figure 4:
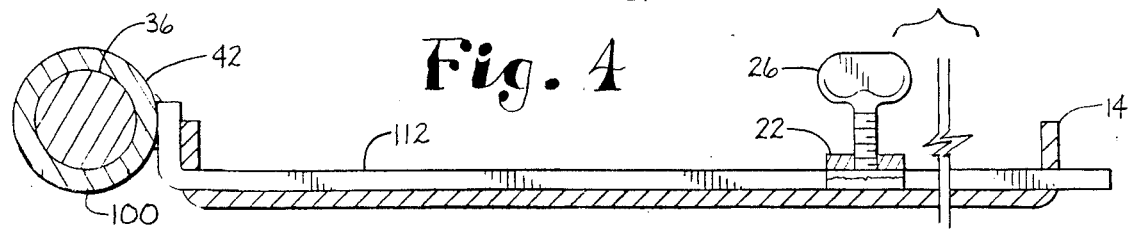
FIG. 4 is an enlarged, fragmentary, vertical, cross-sectional view of the guide taken generally along line 4—4 in FIG. 2.
Figure 5:
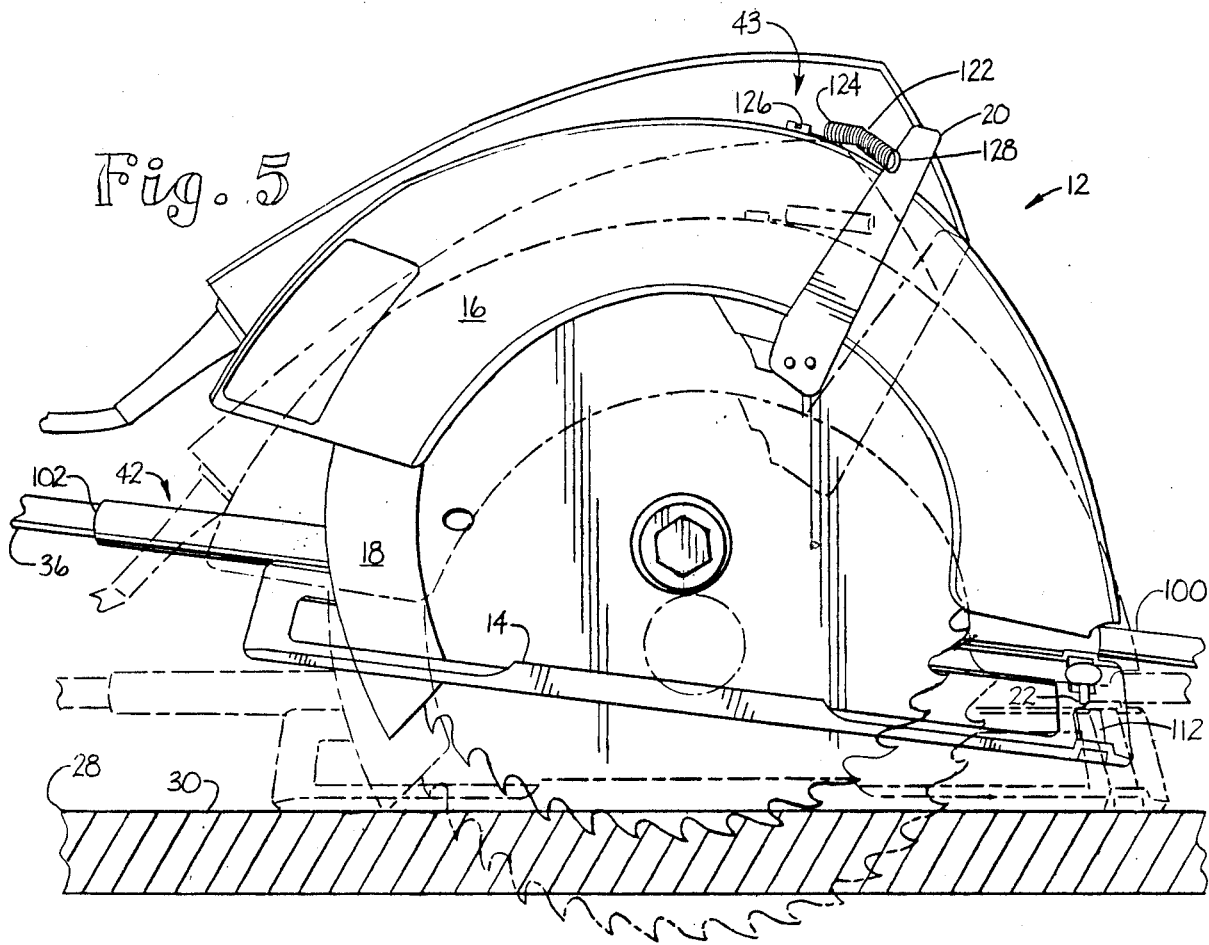
FIG 5 is an enlarged, fragmentary, right side elevational view of the guide and the circular saw.
Figure 6:
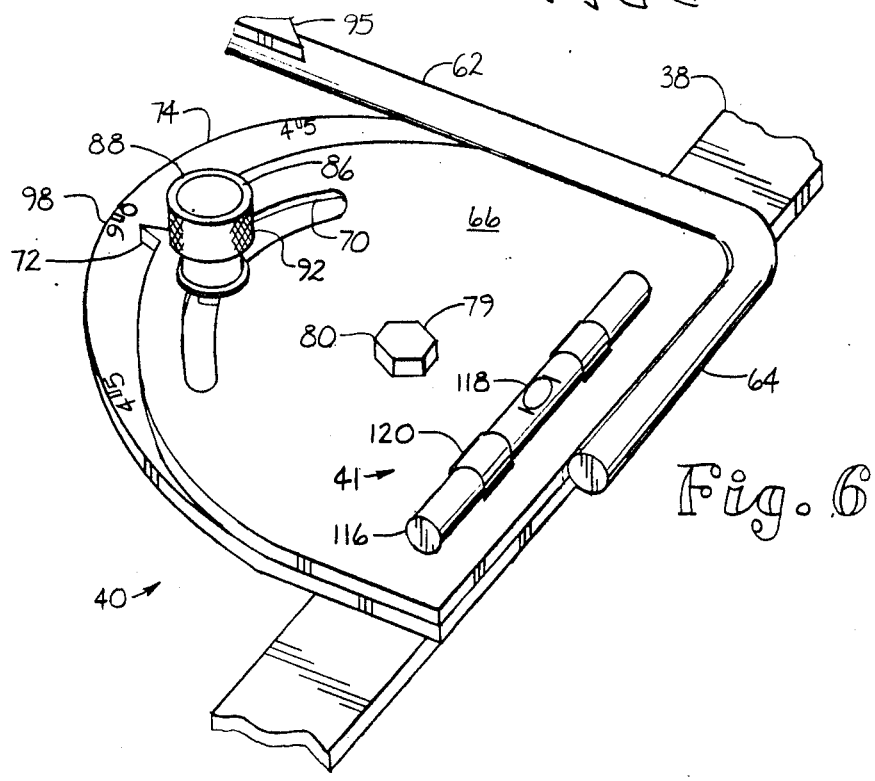
FIG. 6 is an enlarged, fragmentary, perspective view of the guide, particularly showing connector and leveling assemblies of the guide.

The guide rod 36 has a first or front end 44, a second or back end 46 and a generally circular cross-sectional configuration (FIG. 4). The guide rod front end 44 may be tapered or beveled slightly to facilitate insertion into the guide tube assembly 42. Preferably the guide rod 36 comprises a relatively heavy gauge of steel wire with sufficient rigidity to maintain a relatively straight configuration.

III. Angle Section 38.

The angle section 38 includes a right end 48, a left end 50, a top horizontal flange 52 and a back vertical flange 54. The horizontal flange 52 terminates in spaced relation from the angle section right end 48 whereby a cutaway 56 is formed adjacent to the angle section right end 48. A reinforcing bar 58 is affixed to the back of the vertical flange 54 behind the cutaway 56 for stiffening the angle section 38 in this area.

IV. Connector Assembly 40.

The connector assembly 40 pivotally and adjustably interconnects the guide rod 36 and the angle section 38. The connector assembly 40 includes a connecting rod member 60 extending laterally to the left from the guide rod back end 46; a return rod member 62 extending forwardly from the connecting rod member 60 in parallel, spaced relation with respect to the guide rod 36; and an extension rod member 64 extending laterally to the left from the front of the return rod member 62. The rod members 60, 62 and 64 may be formed intergrally with the guide rod 36 by bending a suitable length of guide rod 36 at their respective intersections.

A gusset plate 95 is affixed to the guide rod back end 46, the connecting rod member 60 and the return rod member 62, and includes a front edge 97 which forms an arcute angle of approximately forty-five degrees with respect to the guide rod 36. The gusset plate 95 includes an aperture 99 for conveniently hanging the guide 10 on a peg or a hook (not shown) for storage.

An upper plate 66 is fixedly attached (e.g. by welding) to the return and extension rod members 62, 64 and extends rearwardly from the extension rod member 64 in a substantially horizontal plane. The upper plate 66 includes a pivot pin receiver 68 and an arcuate slot 70 with an angle-indicating pointer 70 longitudinally aligned with the receiver 68 and the approximate center of the slot 70. The arcuate slot 70 is centered upon the pivot pin receiver 68.

A lower plate 74 is affixed (e.g. welded) to the angle section horizontal flange 52 and includes a pivot pin receiver 76 vertically aligned with the pivot pin receiver 68 and a clamp bolt receiver 78 vertically aligned with the arcuate slot 70. A pivot pin subassembly 79 is provided for pivotally interconnecting the plates 66, 74 and includes a pivot bolt 80 aligned with an axis of rotation for the guide 10. The bolt 80 extends vertically through the aligned pivot pin receivers 68, 76 and receives a washer 82 and a locknut 84 below the lower plate 74.

A clamp bolt subassembly 86 includes a clamp bolt 88 with a shank 90 extending through the slot 70 and the clamp bolt receiver 78, and a knurled 92 adapted to be grasped and turned by an operator. A washer 94 is positioned beneath the head 92 on top of the upper plate 66 and a nut 96 is located below the clamp bolt receiver 78 for threadably receiving the clamp bolt shank 90. Angular orientation indicia 98 (e.g. ninety degrees, right forty-five degrees and left forty-five degrees) are provided on the upper face of the lower plate 74 and may be aligned with the angle-indicating pointer 72 to designate certain angular orientations of the guide rod 36 with respect to the angle section 38, which in turn correspond to cut angles.

V. Leveling Assembly 41.

The leveling assembly 41 includes a liquid-filled tube 116 with an air bubble 118 and is secured to the upper plate 66 by a pair of mounting tabs 120 each receiving a respective end of the tube 116. An operator can observe the air bubble 118 in the tube 116 and thus determine if the tube 116 is substantially horizontally aligned. Since the tube 116 is substantially perpendicular to the guide rod 36, the operator can thus determine if the blade of the circular saw 12, which is substantially located in a plane parallel to the guide rod 36, is in a vertical plane. Naturally, other types of level-indicating devices could be employed in place of the tube 116 for indicating the orientations of various components of the guide 10.

VI. Guide Tube Assembly 42.

The guide tube assembly 42 comprises a right or primary guide tube 100 with front and back ends 102, 104 and a left or secondary guide tube 106 with front and back ends 108, 110. The guide tubes 100, 106 are staggered with respect to each other whereby the front and back ends 102, 104 of the right guide tube 100 are located behind the corresponding left guide tube ends 108, 110. The guide tube back ends 104, 108 are mitered.

A front mounting bar 112 is attached to the right guide tube 100 in spaced relation rearwardly from its front end 102 in proximity to the left guide tube back end 110 and projects horizontally to the right therefrom. A back mounting bar 114 is attached to the right guide tube 100 adjacent to its back end 104 and also projects horizontally to the right. The mounting bars 112, 114 are removably attached to the circular saw shoe 14 by the front and back rip guide mounting brackets 22, 24 respectively. The guide tube assembly 42 is thus removably attached to the circular saw 12 with the right guide tube 100 positioned alongside the left edge of the circular saw shoe 14 in juxtaposed relationship therewith. The mounting bars 112, 114 are secured by tightening the thumb screws 26. It will be appreciated that the guide tube assembly 42 can thus be quickly and easily mounted and demounted on the circular saw 12.

VII. Blade Guard Retainer 43.

The blade guard retainer 43 comprises a spring 122 attached at its proximate end 124 to the top of the upper, fixed blade guard 16 by a screw 126. The spring 122 normally extends forwardly in the direction of travel of the circular saw 12 and terminates at a distal end 128. The blade guard retainer 41 is adapted for retaining the lower blade guard 18 in a partially-retracted position. The lower blade guard 18 is retracted until its retracting lever 20 is positioned in front of the screw 126. The spring distal end 128 is then bent behind the retracting lever 20, whereby the lower blade guard 18 is retained in a partially-retracted position.

VIII. Operation.

In operation, the guide 10 is adapted for guiding a circular saw 12 across a variety of workpieces, such as that shown at 28 to form relatively straight, smooth cuts of various angular orientations (e.g. ninety-degrees or square, forty-five degree left, forty-five degree right, etc.). The guide tube assembly 42 is mounted on the saw shoe 14 with the mounting brackets 22, 24 and the mounting bars 112, 114. The guide rod 36 is inserted into the front end of one of the guide tubes 100, 106. The right or primary guide tube 100 may be used for cuts ranging from left forty-five degrees to ninety degrees, and the left or secondary guide tube may be used for cuts ranging from ninety degrees to right forty-five degrees.

The angle section 38 is placed on the workpiece 28 with its horizontal flange 52 on the workpiece surface 30 and its vertical flange 54 against the workpiece back edge 34. The angle section 38 can be held in place by an operator, who can wrap his or her left hand around the angle section left end 50 and the workpiece back edge 34. This position and retaining technique should keep the operator's left hand well away from the blade of the circular saw 12 and thus promote safe operation with the guide 10.

The angular rotational orientation of the angle section 38 with respect to the guide rod 36 is adjustable with the clamp bolt 88 by reference to the angle-indicating pointer 72 and the angular orientation indicia 98 whereby the angles of various miter cuts can be determined relatively accurately and changed relatively quickly. The ends of the arcuate slot 70 can be positioned so that the rotational travel limits are forty-five degrees left and forty-five degrees right whereby an operator can make forty-five degree miter cuts by merely swinging the guide rod 36 and the angle section 38 to their rotational travel limits with respect to each other without reference to the angular orientation indicia 98.

The circular saw 12 is slid back on the guide rod 36 until its blade is in position with respect to the workpiece front edge 32 and can be advanced until its blade clears the workpiece back edge 34 to complete a cut. Throughout the cut, the circular saw 12 can be maintained along a relatively straight travel path by the sliding interaction of a guide tube 100 or 106 and the guide rod 36. Relatively accurate miter cuts can thus be made without having to premark the workpiece 28 with a square or the like.

For right forty-five degree cuts the left or secondary guide tube 106 is utilized because its front end 108 permits the saw to travel farther along the guide rod 36 so that its blade clears the workpiece back edge 34.

The blade guard retainer 41 is particularly useful for making pocket cuts in the workpiece 28 whereby the circular saw 12 is lowered, for example into a middle portion of the workpiece. The lower blade guard 18 is secured in its partially retracted position by the spring 122, the guide rod 36 is inserted in a guide tube 100 or 106, the angle section is placed against the workpiece back edge 34 and the saw 12 is lowered from a raised position until its blade enters the workpiece 28 through its surface 30. As the blade enters the workpiece 28, the lower blade guard 18 is further retracted into the upper blade guard 16 and the retracting lever 20 advances forwardly whereby the retaining spring 122 is released and returns to its release, forward-extending position.

This procedure, which is particularly useful for pocket cuts and other cuts requiring at least partial retraction of the lower blade guard, tends to be relatively safe because the operator need not use one hand to manipulate the retracting lever 20 to initiate the cut by exposing the workpiece surface 30 to the blade. It will be appreciated for safety reasons that once the blade is fully inserted in the workpiece 38, the blade guard retainer 41 is released and does not affect the normal, safety function of the lower blade guard 18.

The leveling assembly 39 is particularly useful for making vertical cuts with the guide 10 and a circular saw 12. For example, the tails of sloping rafters can be cut vertical by placing the angle section on the rafter upper edges and adjusting the angular orientation of the guide rod 36 until the air bubble 118 centers in the tube 116, which indicates to the operator that the saw blade is in a substantially vertical plane. The clamp bolt 88 is then secured and the rafter end can be cut off vertically.

Without the circular saw 12, the guide 10 can be used as an adjustable angle ruling device for marking lines at various angular orientations on workpieces and for checking the angles of various objects. Furthermore, the leveling assembly 39 permits the guide 10 to be used as a level.

It is to be understood that while certain forms of the present invention have been illustrated and described herein, it is not to be limited to the specific forms or arrangement of parts described and shown.

What is claimed is:

1. A guide for guiding a cutting tool on a workpiece including a surface and front and back edges, which comprises:
   (a) a primary guide rod with front and back ends;
   (b) an angle section with a top, horizontal flange adapted to engage the workpiece surface and a vertical flange depending from said horizontal flange and adapted to engage the workpiece back edge;
   (c) a pivotable connector assembly including:
      (1) a connecting rod section connected to said guide rod back end and projecting laterally therefrom;
      (2) a return rod section connected to and extending forwardly from said connecting rod section in parallel, spaced relation with respect to said guide rod;
      (3) an extension rod section connected to said return rod section and extending laterally therefrom in a direction away from said guide rod;
      (4) an upper plate connected to said return rod and extension rod sections;

(5) a lower plate connected to said angle section horizontal flange and projecting rearwardly from said angle section;
(6) a pivot pin pivotally interconnecting said plates; and
(7) clamp means adapted for selectively clamping said plates together;

(d) a primary guide tube including a mounting bar projecting laterally therefrom, said mounting bar being adapted for releaseably mounting in a rip fence mounting bracket of a circular saw and the guide tube being adapted to telescopically and slidably receive said guide rod; and (e) a secondary guide tube mounted in juxtaposed, parallel relation on said primary guide tube and having front and back ends located behind said primary guide tube front and back ends respectively, said secondary guide tube being adapted to permit cutting the workpiece at an angle without said guide interfering with the cutting tool.

2. The guide according to claim 1 wherein said connector assembly includes:
(a) a gusset plate fixedly attached to said connecting rod member and said return rod member.

3. The guide according to claim 1 wherein said connector assembly includes:
(a) an arcuate slot in one of said plates, said slot being located substantially on an arc centered on said pivot pin;
(b) the other of said plates including a clamp bolt receiver aligned with said slot; and
(c) said clamp bolt being positioned in said clamp bolt receiver and slidably positioned in said slot.

4. The combination according to claim 1, which includes:
(a) level-indicating means mounted on said connector assembly.

5. The combination according to claim 4 wherein said level-indicating means comprises:
(a) a liquid-filled tube with an air bubble extending transversely with respect to said connector assembly and attached thereto.

6. In combination with a circular saw including a foot with a rip fence mounting bracket, a fixed upper blade guard and a retractable lower blade guard, the improvement of a system for guiding the circular saw on a workpiece including a surface and a back edge, which comprises:
(a) a guide rod with front and back ends;
(b) an angle section with a top, horizontal flange for engaging the workpiece surface and a vertical flange for engaging the workpiece back edge;
(c) a pivotable connector assembly including:
(1) a connecting rod member extending laterally from said guide rod back end;
(2) a return rod member extending forwardly from said connecting rod member in parallel, spaced relation to said guide rod;
(3) an extension rod member extending laterally from said return rod member in a direction away from said guide rod in parallel, spaced relation to said connecting rod member;
(4) an upper plate fixedly attacked to said extension rod member and extending rearwardly therefrom;
(5) a lower plate mounted on said angle section horizontal flange and extending rearwardly therefrom;
(6) a pivot pin pivotally interconnecting said plates; and
(7) clamp means adapted for selectively clamping said plates together in predetermined, angular, rotational orientations with respect to each other;

(e) a guide tube including a mounting bar projecting laterally therefrom, said mounting bar being adapted for releaseably mounting in the rip fence mounting bracket and the guide tube being adapted to telescopically and slidably receive said guide rod; and (f) said guide tube comprising a primary guide tube and having front and back ends; and (g) a secondary guide tube mounted in juxtaposed, parallel relation on said primary guide tube and having front and back ends located behind said primary guide tube front and back ends respectively, said secondary guide tube being adapted to permit cutting the workpiece at an angle without said guide interfering with the saw.

7. The combination according to claim 6, which includes:
(a) means for retaining said lower blade guard in a partially retracted position.

8. The combination according to claim 7 wherein said retainer means comprises a spring mounted on said upper blade guard and having a forwardly-extending release position and a laterally-extending engaged position, said spring in its engaged position engaging the lower blade guard lever; said spring being releaseable from said blade guard by said circular saw advancing through said workpiece and further retracting said lower blade guard whereby said lower blade guard lever disengages said spring and said spring returns to its release position.

9. In combination with a circular saw including a foot with a rip fence mounting bracket, a fixed upper blade guard and a retractable lower blade guard, the improvement of a system for guiding the circular saw on a workpiece including a surface and a back edge, which comprises:
(a) a guide rod with front and back ends;
(b) an angle section with a top, horizontal flange for engaging the workpiece surface and a vertical flange for engaging the workpiece back edge;
(c) a pivotable connector assembly including:
(1) a connecting rod member extending laterally from said guide rod back end;
(2) a return rod member extending forwardly from said connecting rod member in parallel, spaced relation to said guide rod;
(3) an extension rod member extending laterally from said return rod member in a direction away from said guide rod in parallel, spaced relation to said connecting rod member;
(4) an upper plate fixedly attached to said extension rod member and extending rearwardly therefrom;
(5) a lower plate mounted on said angle section horizontal flange and extending rearwardly therefrom;
(6) a pivot pin pivotally interconnecting said plates; and
(7) clamp means adapted for selectively clamping said plates together in predetermined, angular, rotational orientations with respect to each other;

(e) a guide tube including a mounting bar projecting laterally therefrom, said mounting bar being adapted for releasably mounting in the rip fence mounting bracket and the guide tube being adapted to telescopically and slidably receive said guide rod;

(f) said guide tube comprising a primary guide tube and having front and back ends;

(g) a secondary guide tube mounted in juxtaposed, parallel relation on said primary guide tube and having front and back ends located behind said primary guide tube front and back ends respectively, said secondary guide tube being adapted to permit cutting the workpiece at an angle without said guide interfering with the cutting tool;

(h) level-indicating means comprising a liquid-filled tube with an air bubble mounted on said upper plate and extending in generally parallel relation with respect to said angle section; and (i) a spring mounted on said upper blade guard and having a forwardly-extending release position and a laterally-extending engaged position, said spring in its engaged position engaged in the lower blade guard lever; said spring being releasable from said blade guard by said circular saw advancing through said workpiece and further retracting said lower blade guard whereby said lower blade guard lever disengages said spring and said spring returns to its release position.

* * * * *